(12) United States Patent  
Nemir

(10) Patent No.: US 7,292,419 B1
(45) Date of Patent: Nov. 6, 2007

(54) FAULT INTERRUPTER WITH INTERCHANGEABLE LINE LOAD CONNECTIONS

(76) Inventor: David C. Nemir, 1221 Baltimore Dr., El Paso, TX (US) 79902

( * ) Notice: Subject to any disclaimer, the term of this patent is extended or adjusted under 35 U.S.C. 154(b) by 499 days.

(21) Appl. No.: 10/978,842

(22) Filed: Nov. 1, 2004

Related U.S. Application Data

(63) Continuation-in-part of application No. 10/237,319, filed on Sep. 8, 2002, now Pat. No. 6,831,819.

(60) Provisional application No. 60/322,368, filed on Sep. 9, 2001, provisional application No. 60/516,015, filed on Oct. 30, 2003.

(51) Int. Cl.
*H02H 3/00* (2006.01)
(52) U.S. Cl. ....................................... 361/42
(58) Field of Classification Search ................... 361/42
See application file for complete search history.

(56) References Cited

U.S. PATENT DOCUMENTS

| | | | |
|---|---|---|---|
| 3,403,238 A | 9/1968 | Buehler et al. | |
| 4,473,859 A | 9/1984 | Stone et al. | |
| 4,829,390 A | 5/1989 | Simon | |
| 4,994,933 A * | 2/1991 | Matsuoka | 361/42 |
| 5,394,289 A | 2/1995 | Yao et al. | |
| 6,262,871 B1 | 7/2001 | Nemir et al. | |
| 6,282,070 B1 | 8/2001 | Ziegler et al. | |
| 6,288,882 B1 | 9/2001 | DiSalvo et al. | |
| 6,381,112 B1 | 4/2002 | DiSalvo | |
| 6,804,094 B2 * | 10/2004 | Kampmeyer | 361/42 |
| 6,831,819 B2 | 12/2004 | Nemir et al. | |
| 2005/0024798 A1 * | 2/2005 | Reynoso et al. | 361/42 |
| 2005/0117264 A1 * | 6/2005 | Aromin | 361/42 |

OTHER PUBLICATIONS

National Electrical Manufacturers Association, GFCI Field Test Survey Report, (Jan. 2001).

* cited by examiner

*Primary Examiner*—Ronald W. Leja
(74) *Attorney, Agent, or Firm*—Jeffrey D. Myers; Samantha A. Updegraff; Peacock Myers, P.C.

(57) ABSTRACT

An apparatus and method for making fault interrupter receptacles tolerant to miswiring errors. By employing redundant sense elements plus a special switch configuration, the device obtains a symmetry that makes it unnecessary to designate specific line and load terminals. The addition of open neutral protection, ground assurance, transposed conductor protection and end-of-life protection provides enhanced performance with the addition of only a few parts relative to a conventional fault protection unit.

18 Claims, 6 Drawing Sheets

FAULT INTERRUPTER WITH INTERCHANGEABLE LINE LOAD CONNECTIONS

CROSS-REFERENCE TO RELATED APPLICATIONS

This application is a continuation-in-part application of U.S. patent application Ser. No. 10/237,319, entitled "Fail Safe Fault Interrupter Using Secondary Breaker," filed on Sep. 8, 2002 now U.S. Pat. No. 6,831,819, and claiming the priority date of U.S. Provisional Patent Application Ser. No. 60/322,368, filed on Sep. 9, 2001. This application also claims priority to U.S. Provisional Patent Application Ser. No. 60/516,015, entitled "Fault Interrupter with Interchangeable Line Load Connections," filed on Oct. 30, 2003. The specifications of the above applications are incorporated herein by reference.

BACKGROUND OF THE INVENTION

1. Field of the Invention

This invention relates to a fault interruption device that is configured for wall receptacle applications. By utilizing a special switch configuration, the fault interruption device may be installed with swapped line and load terminals with no loss of protection to local and remote outlets. Ground assurance, open neutral detection and line reversal detection are easily incorporated along with a self testing capacity, enabling a versatile, low cost fault interrupter that presents a high degree of protection against wiring conditions that may compromise safety.

2. Background of the Invention

Ground fault current interrupters (GFCIs) are devices that are often used in load centers and in receptacle outlets in commercial and residential buildings. These devices protect against undesirable electrical leakages to earth ground by sensing current imbalances in the power delivery conductors and interrupting power delivery upon the occurrence of a possibly hazardous leakage condition. Another type of device, called an arc fault current interrupter (AFCI), is used to detect high energy discharges between electrified objects in a distribution network or from one electrified object to ground. Both GFCIs and AFCIs are required by code to be installed in particular locations in dwellings and commercial construction and both devices are occasionally co-located. Although AFCIs and GFCIs protect against different types of events, they have a similar construction and encounter similar problems and the present patent will refer to both types of devices as fault interrupters.

A malfunctioning fault interrupter will not provide protection. Malfunctions may occur due to two broad categories of source: defect or incorrect installation. First, a malfunction may occur due to a defect in design or performance of the fault interrupter or to the malfunction of one or more constituent components. Second, a malfunction may occur if the fault interrupter is incorrectly installed or if required electrical connections to the fault interrupter become loose or are damaged.

In the U.S., electrical distribution networks generally provide power to the home or office via a grounded neutral system. That is, of the two power delivery conductors, one is typically electrically connected to ground at one or more points within the system. This grounded power delivery conductor is known as "neutral". The other, ungrounded conductor, is generally referred to as "hot".

Many fault interrupters are configured as wall receptacle units. These receptacle interrupters generally have one or more local outlets built into the unit and into which an electrical appliance may be plugged. These receptacle fault interrupters often have two sets of electrical connection points called line and load. The line side electrical connection points are designated for connection to the power source. The load side electrical connection points are designated for connection to additional electrical branches which, in turn, may serve as the source for remote electrical outlets. When the fault interrupter is correctly installed, fault protection is provided to both the local outlet as well as to remote outlets. However, if the fault interrupter is installed backwards, that is, the designated load connections are attached to the power source and the designated line connections are attached to the remote outlets, then the fault interrupter may not be able to detect and/or interrupt certain classes of faults.

Even in a correctly wired fault interrupter, if the so-called neutral connection is broken or comes loose, then the fault interrupter may not provide fault protection. This is because most fault interrupters require the neutral connection in order to power the detection electronics and in order to source energy to fire the current interruption relay or circuit breaker. If the neutral connection is open (a so-called "open neutral" condition), then a fault may go undetected or, if detected, may not be interrupted.

The present application discloses a fault interrupter which uses a four pole, single throw switch to ensure that the fault interrupter is tolerant to a certain class of misinstallation known as line/load reversal. By adding open neutral detection and a means for detecting if hot and neutral connections are swapped, a high degree of robustness to misinstallation is provided. By adding a redundant circuit breaker mechanism that is engaged in the case of a malfunction in the fault detection electronics, a self-testing capacity may be provided.

Ground fault current interrupts that use a differential transformer to detect the current imbalance that is indicative of a fault condition have been in use since the 1960's. U.S. Pat. No. 3,736,468 (Reeves et al.) discloses a GFCI which uses a differential sense transformer, the secondary of which is amplified to trip a circuit breaker.

A circuit for detecting an open neutral condition and an open ground condition is described in U.S. Pat. No. 4,598,331 (Legatti). That invention relies upon a supplemental secondary winding on the differential transformer to detect an open neutral condition or an open ground condition. When either an open neutral or an open ground condition occurs, an electrical current through the supplemental secondary winding serves to trip a circuit breaker, thereby removing power. One problem with this approach is that if the GFCI is misinstalled with the source and load sides swapped, neither an open ground nor an open neutral condition is detectable. U.S. Pat. No. 6,040,967 (DiSalvo) describes a fault interrupter that prevents the engagement of a circuit breaker reset mechanism in the case of an open neutral condition. This is done by requiring power connections to both hot and neutral in order to latch the circuit breaker into a closed position. If the neutral connection is missing then it is not possible to reset a tripped circuit breaker. However, if the neutral connection is removed while the fault interrupter is in service, there will be no means to detect this condition or to trip the circuit breaker in the case of a fault.

Technologies that detect and indicate the occurrence of a miswiring condition include U.S. Pat. Nos. 3,800,961 (Kershaw) and 5,099,212 (Nagaishi) which disclose systems by which visual indicators can be used to indicate correct (or incorrect) connections to hot, neutral and ground. U.S. Pat. No. 6,560,079 (Hirsh et al.) discloses a system for detecting a loss of ground condition and transposed hot/neutral conductors in an electrical appliance.

The problem of line/load reversal occurs when a fault interrupter that is designed to provide both local power (through one or more faceplate outlets) as well as provide power and protection to downstream outlets, is wired incorrectly. This happens when the power source is connected to the terminals (the load terminals) that are designated to supply downstream electrical power and the down stream load is connected to the terminals (the line terminals) of the fault interrupter that are designated for connection to the power source. Line/load reversal is a problem because it can result in unprotected power to the uSerial One solution which has been proposed for line/load reversal is the so-called lockout technology described in U.S. Pat. No. 6,245,558 (DiSalvo et al.). This technology requires power to enable a circuit breaker to be engaged after it has been tripped. If a fault interrupter having this technology is installed so that its line terminals are connected to the load side, once the circuit breaker is tripped, there will be no power available to reengage the circuit breaker. Another approach to the problem of line/load reversal is described in U.S. Pat. No. 6,522,510 (Finlay et al.) which uses a resistive element connected at one end to a hot power conductor and on the other end to either a breaker coil or to the gate or base of a switch element. When the fault interrupter is installed with line and load sides reversed, the circuit breaker is tripped, indicating to the installer that an error in installation has been made. The problem with the above two technologies is that while they both have indication means that the fault interrupter has been incorrectly installed, both can provide unprotected power at the local outlet (face power) until such time as the fault interrupter is installed correctly.

Fault interrupters can malfunction, causing the loss of protection against faults. Several solutions to the detection of defective fault interrupters have been proposed. U.S. Pat. Nos. 5,600,524 and 5,715,125 (Neiger, Gershen and Rosenbaum) describe an intelligent GFCI that automatically and periodically tests the fault detection electronics, indicating a malfunction via audible or visual means, and/or by tripping the circuit interruption means or both. The inventions do not test for the correct function of the fault interruption means. U.S. Pat. No. 6,262,871 (Nemir et al.) discloses a fail safe fault interrupter that automatically and periodically tests the fault sensing electronics and that tests for the operation of the fault interruption means and upon the detection of a malfunction, permanently trips a secondary circuit breaker, thereby removing the fault interrupter from service.

3. Objects and Advantages

The present invention encompasses a topology that enables a wall outlet fault interrupter to operate correctly and to provide safety if the line and the load terminals are misconnected, or, equivalently, removes the need to specify line terminals and load terminals. By incorporating open neutral and transversed conductor detection, the fault interrupter will automatically trip so that it never provides unprotected power either to faceplate or to downstream outlets as long as the fault detection/interruption electronics are operational. Finally, by incorporating a secondary system diagnosis and interruption means that is triggered by an auxiliary fault detection mechanism, the entire fault interrupt unit acquires a self-testing capacity. This allows it to fail safe even in the event of a failure of the fault detection electronics. To summarize, the present invention is an electrical fault protection device preferably designed for a wall receptacle implementation that provides the following features:

a) provides a fault detection function and fault interruption function;
b) can provide fault protection to downstream devices;
c) can be installed without regard to line and load sides of the installation;
d) provides ground assurance;
e) will detect an open neutral condition or swapped hot and neutral conductors; and
f) may be provided with a secondary circuit breaker actuation means that can provide redundant protection in the case of circuit malfunction.

SUMMARY OF THE INVENTION

This invention consists of a method and apparatus for fault detection that is robust to miswiring conditions and that provides redundant circuit breaker protection in the case of malfunction. By using a four pole single throw switch that is configured to interrupt both power flow into a faceplate (local) outlet(s) as well as power supplied to a remote outlet(s), power interruption is assured to all service points in the case of a fault. Furthermore, by using redundant current sense coils, ground fault detection can be accomplished irrespective of the wiring orientation with the four pole switch providing protection irrespective of line/load orientation. Finally, by incorporating an auxiliary self-testing means, robustness to circuit defect or malfunction is accomplished.

LIST OF REFERENCE NUMERALS

2—power source
3—Hot conductor
4—Input terminal
5—Neutral conductor
6—Input terminal
8—Output terminal
10—Output terminal
11—Detection/interruption module
12—Fault interrupt receptacle
14—Load
16—Plug
20—Hot side power cord 22—Source conductor
24—Source conductor
26—Current sense coil (transformer)
28—Secondary from current sense transformer
30—Detection electronics
32—Hot side primary circuit breaker switch
33—Neutral side primary circuit breaker switch
34—Appliance load
36—Solenoid
37—Ground fault from appliance load
38—Ground fault from conductor
39—Ground
40—Ground fault
41—Ground fault from conductor
42—Thyristor
43—Ground fault from appliance power cord
44—Conductor delivering power to detection electronics
46—Conductor delivering power to detection electronics
50—Test button
52—Test fault resistance
54—Load side outlet
56—Local outlet
58—Conductor on load side
60—Conductor on load side
62—Current sense transformer
64—Current sense transformer
66—Side A switch
68—Side B switch
70—Four pole single throw switch/circuit breaker
72—Side A terminal 1
74—Side A terminal 2
76—Side B terminal 1
78—Side B terminal 2
80—Ground slot
82—Ground terminal
84—Conductor on ungrounded (hot)
86—Conductor on ungrounded (hot)
88—Conductor on ungrounded (hot) power delivery to local outlet and electronics
90—Conductor on grounded (neutral)
92—Conductor on grounded (neutral)
94—Conductor on grounded (neutral) power delivery to local outlet and electronics
96—Secondary of current sense transformer
98—Secondary of current sense transformer
100—Nodes connecting the two secondaries into the detection electronics
102—Resistor
104—Thyristor
106—Resistor
108—Node connecting to solenoid
110—Gate of thyristor 104
112—Shorting bar
114—Shorting bar
116—Electrical contact point (node)
118—Electrical contact point (node)
120—Electrical contact point (node)
122—Diode
124—Diode
126—Diode
128—Diode
130—Resistor
132—Break in neutral conductor
134—Thyristor gate
138—Self test module
140—Resistor
142—Resistor
144—Resistor
146—Test button signal pick off point
148—Fault detect signal
150—Auxiliary circuit interruption means
151—load
152—Current induction coil for loadside neutral to ground fault
154—Auxiliary thyristor
158—Resistor
164—Resistor
166—Secondary of neutral to ground sense coil
168—Zener diode
170—Node at junction of voltage divider

DESCRIPTION OF THE PREFERRED EMBODIMENTS

Figure 1:
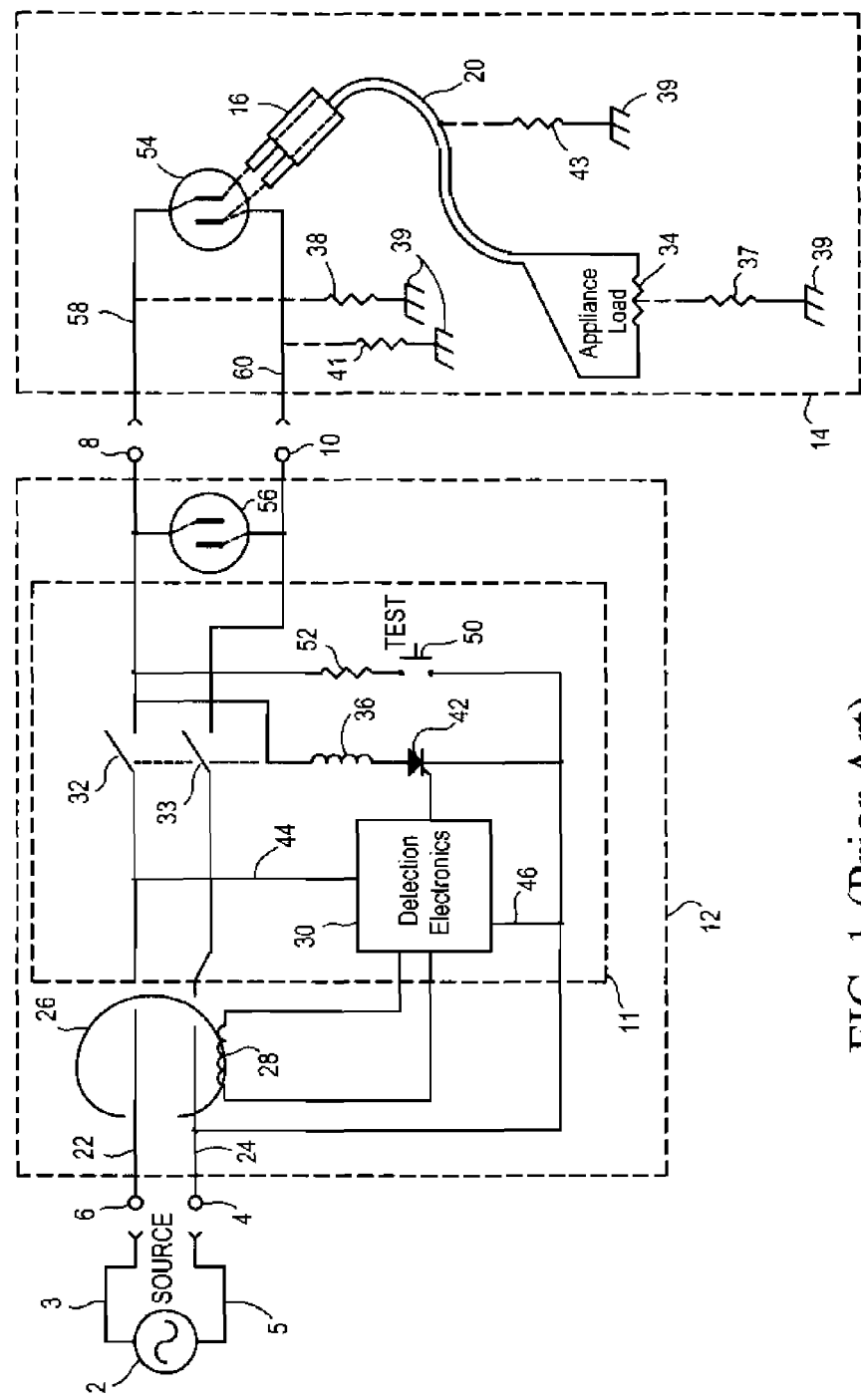
FIG. 1—Block diagram of standard ground fault interrupt circuit
FIG. 2—Block diagram of a fault interrupter with line and load terminals reversed
FIG. 3—Block diagram of the approach of the present invention
FIG. 4—Block diagram of the approach using two three pole switches
FIG. 5—Specific embodiment using a four pole single throw switch
FIG. 6—Specific embodiment incorporating open neutral and transposed conductor detection
FIG. 7—Specific embodiment incorporating ground assurance, transposed conductor detection and the ability to detect a low impedance loadside connection between ground and neutral.

FIG. 1 gives a block diagram that functionally describes the majority of present day ground fault current interrupt (GFCI) devices. This is the prior art circuit that is the basis for almost any such device found in the home or in commercial or industrial facilities. An arc fault circuit interrupt has a similar construction but with a more complicated fault sensing component. Although the present description will be directed at ground fault current interrupters, the exposition may be extended to other classes of fault interrupters. The fault interrupt receptacle 12 consists of a detection/interruption module 11 together with a current sense coil 26 for fault sensing and a local electrical outlet 56. Although in FIG. 1, a single local outlet 56 is depicted, local outlet 56 can represent multiple outlets, all of which are electrically parallel connected. The fault interrupt receptacle 12 is designed for attachment on one side to an alternating current power source 2 by connecting the source 2 to the input terminals 4 and 6 of the ground fault interrupt receptacle 12. The ground fault interrupt receptacle 12 is designed for attachment to a load 14 by using output terminals 8 and 10. Power is delivered from the source 2 via conductors 3 and 5. In the U.S., one of these conductors (for this discussion, conductor 5) is generally required by electrical code to be grounded at the distribution panel and is known as the "neutral" conductor. In such a system, the ungrounded current carrying conductor is often called the "hot" conductor. Within the fault interrupt receptacle 12 and attaching to input terminals 4 and 6 are conductors 22 and 24. Conductors 22 and 24 pass through a current sense transformer 26, thereby acting as the primary for that transformer 26. The secondary 28 of the current sense transformer 26 connects to the detection electronics 30, which may filter and/or amplify and/or otherwise process the voltage from the secondary windings 28 of the current sense transformer 26.

The detection electronics 30 derive power from conductors 44 and 46. In normal operation, electrical current is delivered to the load 14 through circuit breaker switches 32 and 33. In some applications, such as in a load distribution panel, there is a single circuit breaker switch 32 for interrupting electrical current on the ungrounded conductor and there is no circuit breaker switch 33 (equivalently, circuit breaker switch 33 is always closed). For a system with two circuit breaker switches 32 and 33, circuit breaker switches 32 and 33 are closed during normal operation but are driven to be in an open position by solenoid 36 if a fault condition is sensed. Collectively, switches 32 and 33 are known as a double pole, single throw switch, since there are two independent switches (double pole), they conduct electricity in only one position (single throw), and they operate in lockstep, that is, they are configured to always have the same state, either open or closed.

In FIG. 1, the load 14 comprises a set of conductors attached to the load side terminals 8 and 10, plus one or more outlets, represented by a single load side outlet 54, plus any electrical appliance loads 34 that are attached to the load side outlet 54 via a plug-in connection. An example appliance load 34 is depicted in FIG. 1 and is attached using a plug 16 on a power cord 20.

In FIG. 1, ground faults 37, 38, 41, and 43 are depicted with dashed lines to indicate that these are not always present. These represent fault events that a GFCI is designed to sense and to remedy by opening the circuit breaker switches 32 and 33. Any of ground faults 37, 38, 41 or 43 could represent a human being that has come into electrical contact with a high potential conductor and with ground 39 with an attendant possibility of electrical injury.

In normal operation, in the absence of a ground fault, the same amount of electrical current flows in conductors 22 and 24 but in opposite directions. The net magnetic flux in the differential current sense transformer 26 is then zero and the voltage that is generated in the transformer secondary 28 is zero. When circuit breaker switches 32, 33 are closed and a ground fault 37, 38, 41 or 43 occurs, then there is a current imbalance between conductors 22 and 24. This results in a nonzero net magnetic flux being induced in the differential current sense transformer 26. This results in a nonzero voltage being induced in the secondary 28 of the transformer 26. The detection electronics 30 then takes this voltage and processes it to determine if a fault of sufficient magnitude and/or duration is taking place. If the detection electronics 30 determines that an objectionable fault is occurring, then it triggers a thyristor 42, which energizes a solenoid 36 which opens the circuit breaker switches 32 and 33. This serves to remove power from the load side and, therefore, to any fault.

In ground fault interrupt devices that are designed for an electrical system that uses a grounded neutral, there is generally a second current induction coil that is designed to detect low impedance connections between the neutral and ground at the load side of the GFCI device (fault 41). Without this induction coil, a neutral to ground fault 41 may be hard to detect since it involves very low currents. For the sake of clarity, this second coil is not depicted in FIG. 1.

Test button 50 allows a manual test of the proper operation of the fault sensing/interrupting circuitry. When test button 50 is manually engaged, it causes a current flow through test resistor 52, resulting in an electrical leakage around the differential current sense transformer 26. This imbalance results in a voltage across the secondary 28 and is recognized as a fault by the detection electronics 30. The detection electronics 30 then energize thyristor 42, causing the circuit breaker contacts 32, 33 to be opened. A user can thus manually test the GFCI by engaging the test button 50 and then listening for the relay contacts 32, 33 to open or by observing a visual indication that the circuit breaker contacts 32, 33 have opened.

Although FIG. 1 is a representative embodiment of a GFCI, there are many possible permutations. For example, the detection electronics 30 in FIG. 1 may be simply a pass through connection to the gate of thyristor 42, in which case the secondary 28 of differential transformer 26 generates sufficient energy to trigger thyristor 42. Alternatively, the detection electronics 30 may consist of transistors, operational amplifiers and other components to amplify and/or filter the voltage developed on secondary 28. The solenoid 36 and/or the test button 50 may receive power from the load side of circuit breaker contact 32 as shown, or may be connected on the source side of circuit breaker contact 32. The solenoid 36 may be energized by a thyristor 42 as depicted, or may be energized by a transistor or other type of switch. The solenoid 36 may be replaced by an alternative type of trip mechanism such as a bimetallic element or a fusible link.

In FIG. 1, the ground fault interrupt receptacle 12 consists of the detection/interruption module 11 together with a current sense coil 26 and a local outlet 56. Physically, this outlet 56 (and possibly additional parallel connected outlets) is contained within the GFCI receptacle 12. Electrically, this outlet 56 is parallel connected with load outlet 54 and so a ground fault that occurs in an appliance that is plugged into outlet 56 will be recognized by the detection electronics 30 and then interrupted by circuit breaker switches 32 and 33 in an identical way as for load outlet 54.

FIG. 1 represents a somewhat general topology inasmuch as there can be local outlet(s) 56 and remote load outlet(s) 54. In some embodiments, the ground fault interrupt receptacle 12 will not be designed for connection to remote outlets and output terminals 8 and 10 will be missing. Only outlet 56 will be present. In other embodiments, the ground fault receptacle will not contain any local outlets. In such a case, the face of the ground fault receptacle might have a test and reset button but no outlets. Such embodiments are specifically designed to protect downstream outlets (that is, one or more load outlets like load outlet 54). Most GFCI outlets sold in the U.S. today have one or more local outlets 56 and also have output load terminals 8 and 10 to allow the connection of multiple downstream load outlets 54 and thus to provide maximum flexibility. This could be useful, for example, in a bathroom where one outlet is a GFCI outlet, and a second outlet is a standard outlet that is wired to, and receives power from, the load side of the first outlet and that consequently receives GFCI protection from the first outlet.

A possible wiring fault can occur if either of the input terminals 4 or 6 is loose or not connected. Assuming a grounded neutral electrical system where conductor 24 is on the neutral side, we can see that if the connection to the neutral side terminal 4 alone is unconnected, power can still be supplied to a ground fault (since the hot side terminal 6 is connected) but it will not be possible to detect or to interrupt a fault at the local outlet 56 or the remote load outlet 54. This is because the detection electronics rely upon both connections 44 and 46 to, respectively, the hot and neutral conductors in order to receive power. If the neutral side conductor is not connected, then it is not possible to deliver power to the detection electronics 30 via line 46. Furthermore, the solenoid 42 requires the connection of line 24 in order to be fired into conduction and to thereby trip the circuit breaker switches 24 and 33. So, the loss of a neutral connection (a so-called "open neutral" condition) compromises both fault detection and fault interruption.

Figure 2:
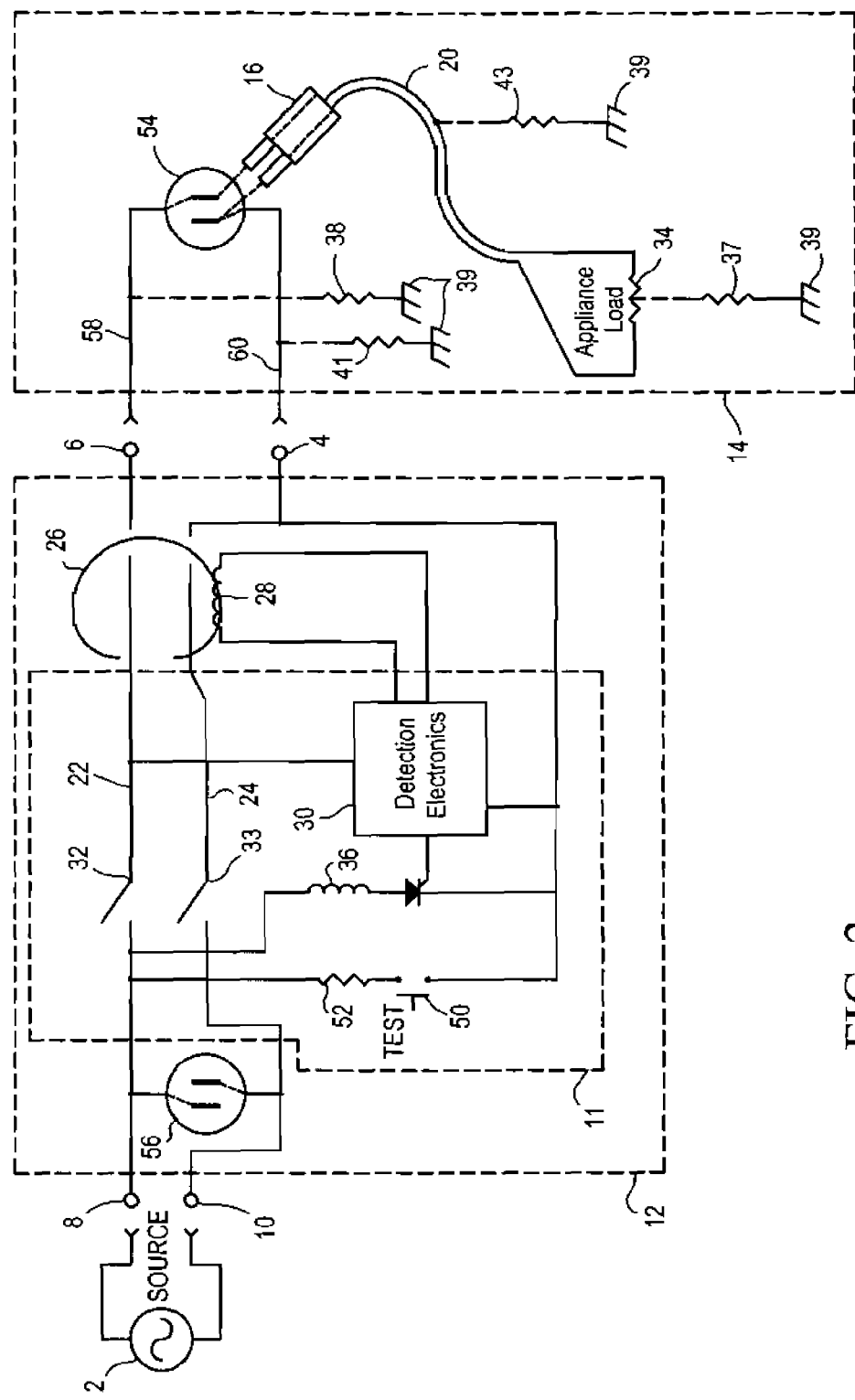

FIG. 2 illustrates the situation where a ground fault interrupt device is miswired with the output terminals 8 and 10 connected to the source 2 and the input terminals 4 and 6 are connected to the load 14. This is known as a swapped line/load condition. The load side outlet 54 is still protected since any ground fault causes an imbalance in the current flowing in conductors 24 and 22, in turn causing a voltage in the transformer secondary 28 which is detected by the detection electronics 30 and causes an opening of the circuit breaker switches 24 and 33, thereby removing power from the fault. Also, the test button 50 still functions, causing a simulated fault to occur and causing the circuit breaker switches to open. From the manual test using test button 50, the user would expect that the ground fault interruption protection is working. However, ground faults that occur in any appliance plugged into local outlet 56 will not be detected. This is because any ground fault that occurs at the electrical location of outlet 56 does not result in a current imbalance in the sense transformer 26. Accordingly, there is no imbalance in transformer 26 and hence no trip of the circuit breaker switches 24 and 33. Furthermore, even if there were a trip of circuit breaker switches 24 and 33, it would not protect local outlet 56 or appliances plugged into local outlet 56. This is because the circuit breaker switches are not located between local outlet 56 and the source 2 and so they are unable to interrupt power delivery to outlet 56. The problem of swapped line/load terminals is a common problem in electrical installations. It can occur because of receptacle installation by nonprofessionals. However, even trained electricians can make installation mistakes. It is for this reason that the receptacle design of the present invention, that is indifferent to the connection order of line and load, is desirable.

Figure 3:
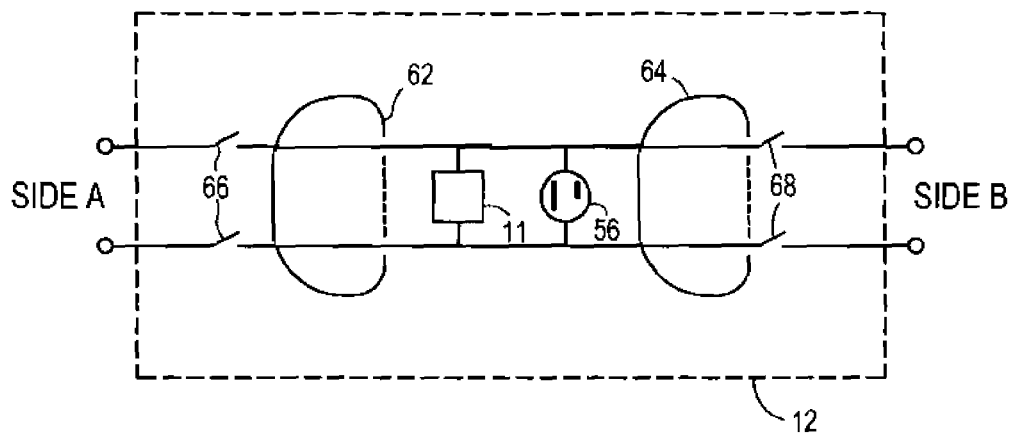

FIG. 3 depicts a block diagram of the present invention. The key idea is to provide the ability to sense a fault and to interrupt the circuit on both sides of the fault detection electronics/local outlet so that the orientation of the receptacle at the time of installation is immaterial to the derived safety. In FIG. 3, the two sides of the receptacle 12 are denoted as SIDE A and SIDE B. There are two current sense transformers 62 and 64 to detect a current imbalance. If SIDE A is attached to the source and SIDE B is attached to one or more loads or remote outlets, then if a ground fault occurs in an appliance that is plugged into local outlet 56, it will cause a current imbalance in the conductors running through sense transformer 62 and will be detected as a fault by the detection electronics (note that the secondaries of transformers 62 and 64 will be connected to the detection/interruption module 11 but these connections are not shown in FIG. 3). In a similar way, if a ground fault occurs in the loads, outlets or appliances attached to SIDE B, they will cause a current imbalance in the conductors running through transformer 64 as well as transformer 62 and so this ground fault condition is detectable. Whenever a fault is detected, both sets of switches 66 and 68 are controlled to open to remove power from the fault. This ensures that power delivery to the fault is always interrupted subsequent to a fault occurrence.

If the receptacle 12 is installed so that SIDE B is attached to the source and SIDE A is attached to the load, then transformer 64 provides fault detection for ground faults in appliances attached to local outlet 56 and both transformers 64 and 62 will detect a ground fault that occurs on the load side. Regardless of the source of the fault, upon the detection of a fault, both sets of switches 66 and 68 are opened, guaranteeing that power is removed from a ground fault. Accordingly, in terms of the ability to detect and interrupt a fault, this topology is insensitive to the particular orientation of the receptacle 12 that happens to be implemented at the time of installation. It also provides a degree of redundant protection to remote outlets if one of the sense coils fails.

Figure 4:
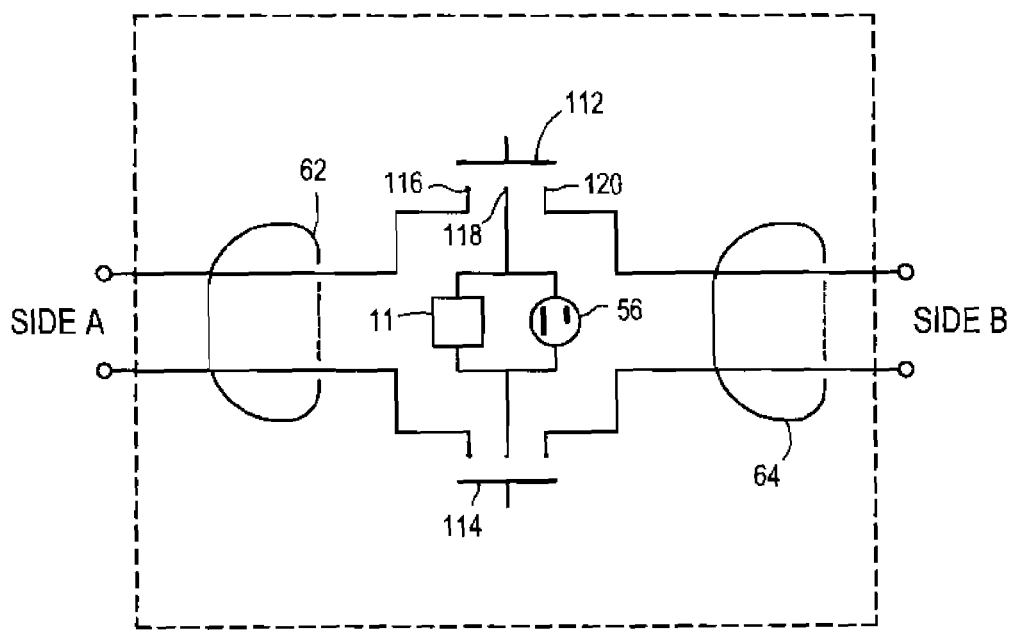

FIG. 4 depicts an alternative switch configuration for a fault interrupt receptacle 12. As in FIG. 3, current sense transformers 62 and 64 serve to detect a current imbalance that is indicative of a fault condition. The secondaries of both transformers 62 and 64 are connected to the detection/interruption module 11 (connections not shown). Shorting bars 112 and 114 are used to connect Side A, Side B and the local outlet 56 and detection/interruption electronics 11 to applied power. The topology is completely symmetrical, so, the source can be attached to Side A and the load to Side B, or vice versa, with either orientation resulting in protected power delivery to the local outlet 56 and to remote outlets or loads that are attached to the side opposite to the source side. The function of shorting bar 112 is to engage to make electrical contact with nodes 116, 118 and 120 when resetting the receptacle 12 and to mechanically separate from nodes 116, 118 and 120 when interrupting power. Shorting bar 114 operates in an identical way as shorting bar 112 and operates in tandem with shorting bar 114, that is, when shorting bar 112 is engaged, so is shorting bar 114. When shorting bar 112 is released, so is shorting bar 114. One advantage to configuring the switch into a shorting bar type of topology is that the shorting bar 112 may be mechanically configured to have a triangular arrangement with contacts on the three corners and force application occurring at the center. This will result in even forces being distributed over the three contacts.

Figure 5:
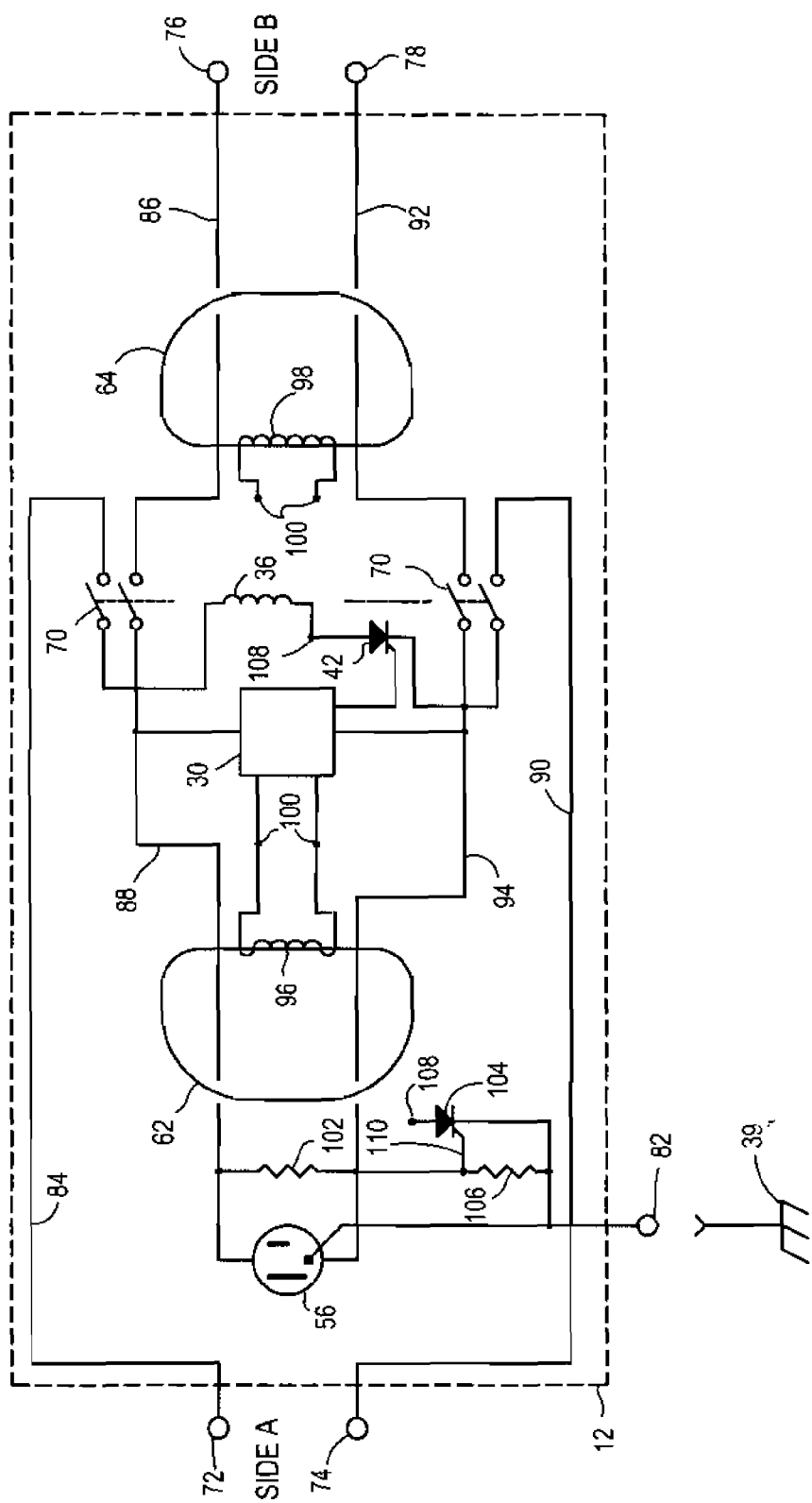

FIG. 5 depicts a block diagram for the preferred embodiment of circuit breaker switches of the present invention as they might be used in a ground fault interrupt receptacle. Conductors 88 and 94 provide power to the local outlet 56 and act as primary windings for transformer 62. Conductors 86 and 92 provide power to/from side B and act as primary windings for transformer 64. The secondary 96 of transformer 62 and the secondary 98 of transformer 64 feed together into the detection electronics 30. In FIG. 5, this is depicted as a parallel connection of the secondaries 96 and 98 through nodes 100. However, the connection of these secondaries may be made in a way other than a direct connection. When the detection electronics 30 detects a fault condition and fires the thyristor 42, it serves to energize the solenoid 36, thereby causing the four pole single throw switch 70 to open, with all four switches opening at the same time. In the absence of a fault, a reset mechanism (not shown) may be used to engage the switch 70 into a closed position, thereby powering the local outlet 56 and the detection electronics 30. As per the discussion regarding FIG. 3, the system in FIG. 5 is symmetrical and may be connected to source or to load on either side while still providing a ground fault detection/interruption capability at the local outlet 56 as well as any connected loads. If Side A is connected to the power source, then a ground fault that occurs on Side B causes an imbalance in current flow between conductors 86 and 92 and is sensed using transformer 64. If side B is connected to the power source, then a ground fault that occurs on Side B causes an imbalance in current flow between conductors 86 and 92 and is sensed using transformer 64. Regardless of which side is connected to the power supply, anytime that a ground fault occurs in the power cord or within an appliance that is plugged into outlet 56, it will cause a current imbalance between conductors 88 and 94 and will be sensed by transformer 62.

FIG. 5 illustrates the connection of a ground. Ground terminal 82 is generally provided on the receptacle 12 as a screw terminal. This connection is then designed to be electrically connected to earth ground 39. In many installations, a ground fault receptacle 12 will be mounted into a grounded outlet box with the screw connections between receptacle 12 and the outlet box serving to establish the ground connection. The local outlet 56 will have a third slot (generally half round in the U.S. system) that is designated for ground connection.

Assume that in FIG. 5, terminal 72, conductor 84, conductor 88, conductor 86 and terminal 76 are designated as the "hot" or ungrounded power delivery elements. Then terminal 74, conductor 90, conductor 94, conductor 92 and terminal 78 are designated as the "neutral" or grounded power delivery elements. Given these definitions, by the addition of resistors 102 and 106 and thyristor 104, open neutral and line transversal protection can be provided. In FIG. 5, node 108 is attached to one side of solenoid 36 and is attached to the anodes of thyristors 42 and 104 (note that node 108 appears in two places in FIG. 5). The neutral conductor is attached to ground at one or more remotely located points in the electrical distribution system, usually at a load distribution panel. Because of this connection, the neutral conductor 94 will have a potential very close to ground potential and the voltage at the gate 110 of thyristor 104 will be close to ground potential and so thyristor 104 will be inhibited from firing. If an open neutral condition occurs, then the gate 110 of thyristor 104 attains a voltage that is derived from a voltage divider made up of resistors 102 and 106 and taken from the hot conductor 88 to ground 39. The thyristor 104 is fired, causing a momentary current flow into ground 39 and thereby firing solenoid 36, even in the absence of a neutral connection. This serves to open the circuit breaker contacts 70.

Figure 6:
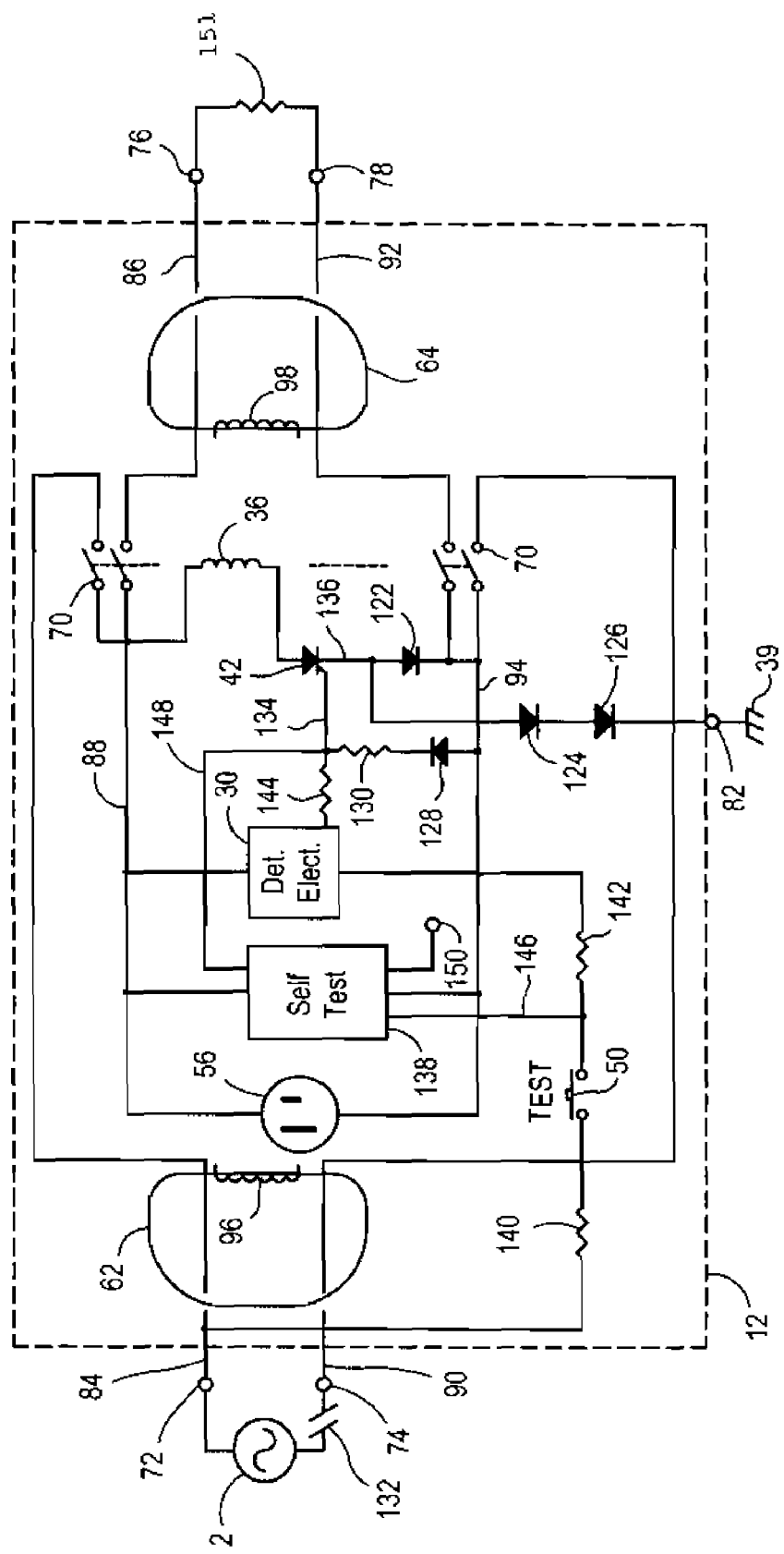

FIG. 6 depicts a circuit that will force the circuit breaker switches to open in the case of an open neutral condition or in the case of swapped hot and neutral connections at the source terminals. In FIG. 6, a source 2 is assumed to be connected to the terminals 72 and 74 and a load 151 is assumed to be connected to terminals 76 and 78. This is for the purposes of explanation, although, as is readily seen, the circuit is completely symmetric between terminal pair 72, 74 and terminal pair 76, 78 and so the choice of which side to connect to source 2 and to load 151 is arbitrary. As discussed previously, load 151 can represent one or more remote outlets, a light, a motor or any one of numerous possible AC electrical appliances that might be connected on the load side of fault receptacle 12. It is further assumed that the fault interrupt receptacle 12 is connected to ground 39 through the designated ground terminal 82 that is present on most fault interrupt receptacles. Diodes 122, 124 and 126 serve a dual function. First, they ensure isolation between the neutral conductor 94 and the ground terminal 82. Diode 126 prevents current flow from ground 39 to neutral on a path through diode 122, and thyristor 42 blocks current flow from going in the other direction to the ground terminal 82. Similarly, diode 122 prevents current flow from the neutral conductor 94 to the ground terminal 82 through the path that goes through diodes 124 and 126, and thyrister 42 blocks the reverse current flow, preventing it from flowing through the path through diode 122.

The detection electronics 30 are connected between the hot conductor 88 and the neutral conductor 94. When a fault is detected, the detection electronics 30 identifies the event and then responds by firing the gate 134 of the thyristor 42. This has the effect of causing current to flow from the hot conductor 88 through solenoid 36, and through thyristor 42, thereby causing the circuit breaker switches 70 to open. When the neutral connection from the power source is secure and is attached to ground at a remote location, the voltage potential difference of the neutral line 94 should be very close to a ground potential. All diodes have a forward voltage drop. For silicon diodes, this drop is generally between 0.6 and 0.7 volts. So, diode 122 represents a voltage stand-off from ground of about 0.65 volts and diodes 124 and 126 represent a voltage stand-off from ground of about 1.3 volts. Accordingly, if the neutral line 94 is holding a ground potential, when thyristor 42 is fired, all solenoid current should flow through diode 22 to the neutral line 94 and none should flow through diodes 124 and 126 into ground 39.

If a break or bad connection (depicted as a discontinuity 132) causes the neutral conductor 90 to become disconnected, this results in the so-called "open neutral condition". Alternatively, if the lowermost switch of the four pole single throw switch 70 is open, this will result in an open neutral condition. With an open neutral condition, the detection electronics block 30 is nonfunctional because it needs connections to two distinct voltage potentials in order to have internal power for running detection electronics, thereby rendering the detection electronics unable to detect a fault condition. However, since the detection electronics does not have a connection to neutral, the entire detection electronics circuit, including the thyristor gate 134 floats to attain the potential of the hot conductor 88. Since the cathode 136 of thyristor 42 has a potential that is only two diode drops away from ground, thyristor 42 is fired with the current going through diodes 124 and 126 into ground 39. Thus, an open neutral condition results in the opening of circuit breaker switches 70.

During normal operation, diode 128 will never have a forward bias and so it will not conduct electrical current. Similarly, during an open neutral condition, diode 128 will not have a forward bias. However, if a connection is made so that the neutral and the hot conductors are miswired, that is, the hot conductor 84 is attached to the source neutral conductor and the neutral conductor 90 is attached to the source hot, then current will flow in diode 128 and resistor 130, causing the firing of thyristor 42 into diodes 124 and 126 and thereby into ground 39, resulting in the opening of the circuit breaker switches 70. This provides protection against the occurrence of transposed source connections where the hot side of the source is connected to As discussed in conjunction with FIG. 5, the current sense transformers 62 and 64 are used to sense current imbalances on the line and load sides of the fault interrupt receptacle. In FIG. 6, the secondaries 96 and 98 are electronically monitored by the detection electronics 30 but the connections are not shown.

The self-test block 138 in FIG. 6 serves to provide a redundant means to check the correct performance of the overall circuit function. This acts as a means for the so-called "end-of-life" feature whereby the fault interrupter receptacle either signals an inoperable status or permanently removes power from the local outlet 56 and remote load 152. The self test block 138 is simply an electronic delay circuit. Any time that either a manual test occurs or a fault event is sensed, the self test block 138 delays for a period of time (say 50 milliseconds) which is an amount that should be more than sufficient to open the circuit breaker switches 70. After that amount of time, the self test block then fires a control line 150 using power derived from lines 88 and 94. In the absence of a malfunction in the detection/interruption electronics, this control action will be meaningless. This is because the circuit breaker contacts 70 will have already been opened and so there is no power available to trip an interrupter. Control line 150 could be used as an additional gate trigger for thyristor 42 and/or it could be used to open a redundant circuit interruption means (not shown). If the fault detection/interruption means functioned correctly, then the circuit breaker switches 70 should have opened, and control line 150 has no power. However, if the circuit breaker switches 70 have not opened, this suggests the presence of a malfunction within the fault interrupt receptacle and this malfunction may be in the sensing electronics 30 or in the fault interruption portion which consists of thyristor 42 and solenoid 36 and circuit switches 70. So, the output 150 from the self test block 138 can be used to blow a fuse (not shown) and thereby providing a visual or audible indicator to be permanently turned on, and/or it can be used to activate an auxiliary circuit interruption means that is independent of solenoid 36 and thyrister 42.

To recap, the self test block 138 is activated any time that a fault is sensed by the detection electronics 30. In addition, the self test block is activated any time that the manual test button 50 is engaged. So this approach to self diagnostics is automatic (since it automatically occurs any time a fault is sensed) and it is also manual since it can be implemented through activation of the manual test button 50.

Although not discussed in conjunction with FIGS. 1 through 6, almost all commercial GFCI's have a provision for detecting a low impedance connection to ground on the load side of the GFCI. That is, they are equipped to detect a load side connection between the neutral conductor and ground. This is important because if there is a load side ground connection, then it is possible that a person could come in contact with hot and ground with the ground current then returning on the neutral line. The result would be a ground fault but with no current imbalance in the current sense transformer, resulting in an unrecognized ground fault. The solution is to use an auxiliary current induction coil or transformer which detects the presence of a low impedance path to ground from the neutral conductor.

Figure 7:
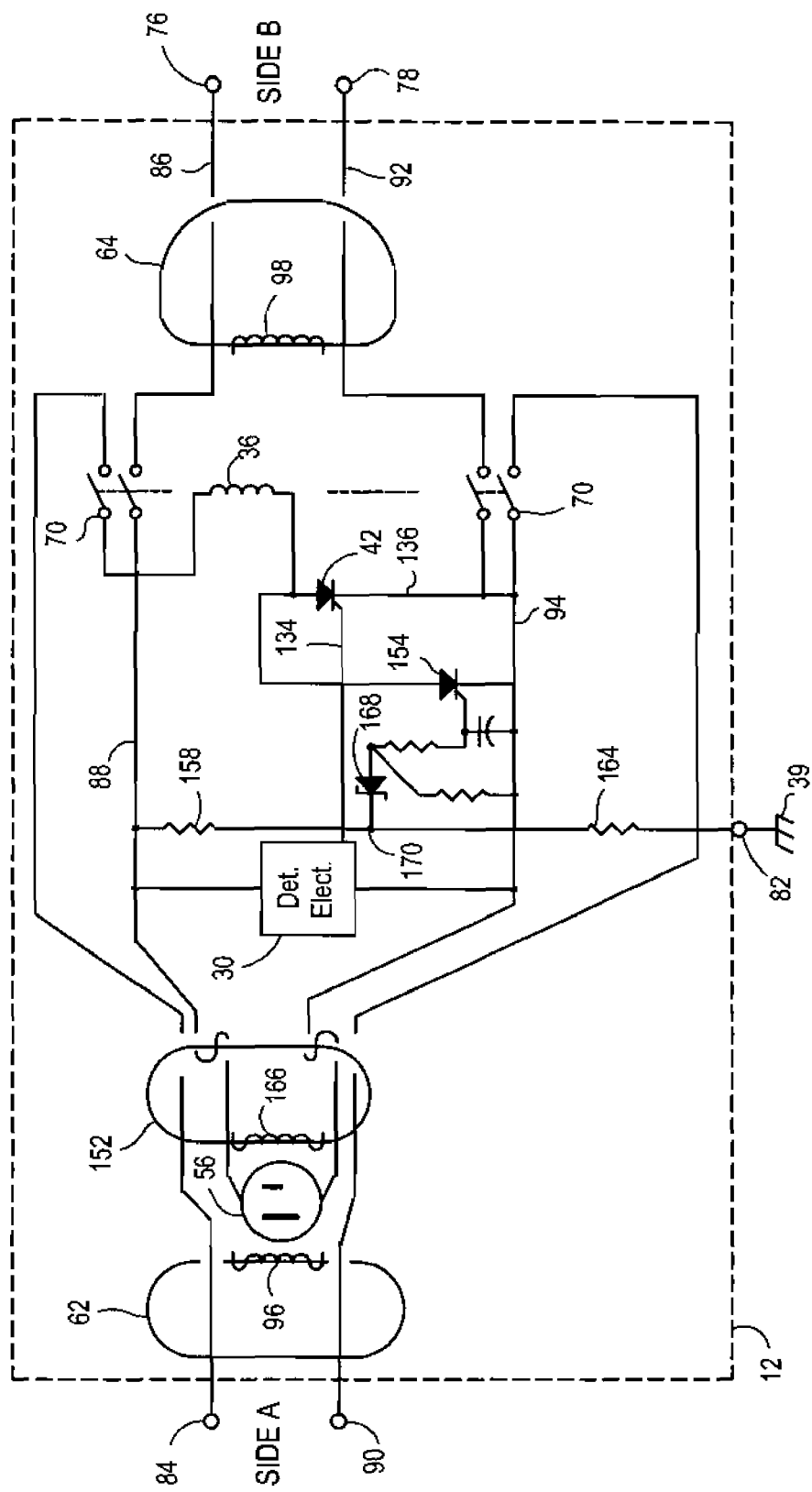

FIG. 7 portrays the interchangeable line/load circuit of the present invention with the addition of a current induction coil 152 for sensing a low impedance path from neutral to ground on the load side of the fault interrupt receptacle 12. Both power delivery conductors that transfer power from Side A to Side B go through this current induction coil 152 one time. If there is a low impedance path to ground on the load side of this coil, it will cause loop currents that will be sensed via secondary 166 by the detection electronics 30 (the connection between secondary 166 and detection electronics 30 is not shown). If the fault is of sufficient magnitude and/or duration, the detection electronics 30 then fires the thyristor 42 and thereby causes circuit breaker 70 to open. The power delivery conductors that furnish power to outlet 56 go through the sense coil 152 twice. The reason that different numbers of turns are used for the conductors that pass power from Side A to Side B as opposed to the conductors that pass power to the local outlet 56 is to avoid cancellation effects that might occur if the turns were the same, power came from Side A to local outlet 56 and a low impedance load side neutral to ground connection was present. There are other combinations of primary winding numbers and sense that will ensure that there is never a cancellation of neutral to ground effects.

FIG. 7 also portrays an alternative for ensuring that the receptacle 12 is grounded and for ensuring that the hot and neutral connections are made correctly. This is done by using an auxiliary thyristor 154. During normal operation, thyristor 42 is the active device upon the detection of a fault by the detection electronics 30. Auxiliary thyristor 154 can serve the same role as thyristor 42. That is, when it is fired it serves to activate solenoid 36, which in turn, causes switch 70 to open. Resistors 158 and 164 form a voltage divider between the hot side conductor 88 and ground 39. In its preferred embodiment, resistor 158 will be a relatively large value to limit the current introduced into ground 39 and resistor 164 will be a relatively small value so that in normal operation, the voltage at node 170 will be relatively small. If the ground connection 82 is missing, then the voltage at node 170 will be periodically pulled positively to the potential of hot conductor 88. When the node 170 voltage exceeds the reverse breakdown voltage on zener diode 168, it will cause the firing of thyristor 154. In this way, the circuit provides ground assurance so that if the ground connection is missing, the circuit breaker contacts 70 are opened. Even when the ground connection is secure, it is possible that the ground 39 and the neutral 94 connections can have potentials that are several volts different. This can happen due to voltage drops in the neutral line that are due to current flow through conductor resistances. Zener diode 168 serves to provide a margin of voltage stand-off between ground and neutral potentials. An open ground condition is only sensed if node 170 exceeds the voltage at the gate of thyristor 154 by an amount greater than the zener voltage value. This allows the avoidance of false tripping.

In a grounded neutral system, if conductors 84 and 90 are transposed, that is, conductor 90 is connected to the hot side of the source and conductor 84 is connected to the neutral side of the source, then the voltage at the cathode of thyristor 154 will be periodically much more negative than the voltage at node 170. When the voltage difference significantly exceeds the voltage on zener diode 168, it will cause a firing of thyristor 154. In this way, the circuit depicted in FIG. 7 provides protection against miswiring of the hot and neutral power because any time that miswiring occurs, the circuit breaker will trip upon energization by the source.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosure of all references, applications, patents and publications cited above are hereby incorporated by reference.

What is claimed is:

1. An apparatus for electrical fault protection, said apparatus comprising:
   a) a pair of connections nominally designated for receiving electrical power from a power source;
   b) a pair of nominally designated connections for delivering power to a remote load;
   c) redundant fault sensing components that detect an unsafe electrical condition; and
   d) redundant electrical interruption components that are is activated to remove power from said unsafe electrical conditions;
   wherein said two pairs of connections can be interchanged without compromising ability of said fault sensing components to detect an unsafe electrical condition.

2. The apparatus of claim 1 wherein said pair of connections for receiving electrical power are line connections.

3. The apparatus of claim 2 wherein said pair of connections for delivering power to a remote load are load connections.

4. The apparatus of claim 3 further comprising a component for detecting a low impedance path to ground from a neutral conductor attached to said load connections.

5. The apparatus of claim 4 wherein said component detecting a low impedance path comprises a single current induction coil which is responsive to loop currents.

6. The apparatus of claim 4 wherein said component for detecting a low impedance path functions even when said line connections are swapped with said load connections.

7. The apparatus of claim 2 wherein one of said line connections is designed for use with an ungrounded power input and the other of said line connections is designed for attachment to a grounded power input.

8. The apparatus of claim 7 wherein if said connection designed for use with a grounded power input is not connected, said electrical interruption components are activated.

9. The apparatus of claim 8 wherein said activation occurs through the tiring of a thyristor, thereby causing a momentary current flow into ground.

10. The apparatus of claim 2 wherein if said line connections are transposed, said electrical interruption components are is activated.

11. The apparatus of claim 10 wherein said activation occurs through the tiring of a thyristor, thereby causing a momentary current flow into ground.

12. The apparatus of claim 1 as implemented into a wall receptacle.

13. The apparatus of claim 12 wherein said wall receptacle contains one or more electrical outlets.

14. The apparatus of claim 13 wherein said pair of connections for delivering power to a remote load allows connection of remote electrical outlets.

15. The apparatus of claim 14 utilizing two distinct current sense transformers of which one of said two distinct current sense transformers serves to detect an electrical fault at an electrical outlet within said wall receptacle and the second of said two distinct current sense transformers serves to provide electrical fault detection for at a said remote electrical outlets.

16. The apparatus of claim 1 wherein if a connection to electrical ground is missing, said electrical interruption components are is activated.

17. The apparatus of claim 1 wherein each of said redundant electrical interruption components comprises a four-pole single throw switch.

18. The apparatus of claim 1 wherein each of said redundant electrical interruption components comprises a shorting bar that is engaged to electrically connect three electrical contacts and that is disengaged to electrically disconnect said three electrical contacts.

* * * * *